United States Patent [19]
Diem

[11] Patent Number: 5,485,503
[45] Date of Patent: Jan. 16, 1996

[54] METHOD OF REMOTE LAUNCHING APPLICATIONS IN A MESSAGE DELIVERY SYSTEM

[75] Inventor: Darrell D. Diem, Boynton Beach, Fla.

[73] Assignee: Motorola, Inc., Schaumburg, Ill.

[21] Appl. No.: 100,832

[22] Filed: Aug. 2, 1993

[51] Int. Cl.⁶ ................................................. H04M 11/00
[52] U.S. Cl. .......................... 379/57; 379/63; 340/825.44
[58] Field of Search .................................. 379/57, 63, 58, 379/59; 340/825.26, 825.27, 825.44; 455/38.1, 33.1

[56] References Cited

U.S. PATENT DOCUMENTS

| | | | |
|---|---|---|---|
| 5,043,721 | 8/1991 | May | 340/825.44 |
| 5,054,110 | 10/1991 | Camroe et al. | 455/33.1 |
| 5,138,311 | 8/1992 | Weinberg | 340/825.44 |
| 5,315,637 | 5/1994 | Breeden et al. | 379/63 |
| 5,371,779 | 12/1994 | Kobayashi | 379/63 |
| 5,377,185 | 12/1994 | Bardusk | 379/63 |

OTHER PUBLICATIONS

EMBARC Advanced Messaging by Motorola, Motorola and NewsStream are trademarks of Motorola, Inc. RC-5-60 Sep. 1992.

EMBARC Wireless Work Shop, Data Applications Toolkit, published by Motorola, Inc. May 1993.

Primary Examiner—Edward L. Coles, Sr.
Assistant Examiner—Fan Lee
Attorney, Agent, or Firm—Gregg E. Rasor

[57] ABSTRACT

A first portable selective call receiver (130) updates a record in a database in the first portable selective call receiver, and automatically creates a message packet (200) in response to the record updating, the message packet (200) including message data (204) comprising changes updated to the record. The first portable selective call receiver (130) then sends the message packet (200) to a central paging communication system (100). The central paging communication system (100) receives the message packet (200), couples destination address information with the message packet (200) to provide a message, and wireless transmits the message over a paging communication channel. A second portable selective call receiver (130) receives the message from the paging communication channel, and updates a record in a database in the second portable selective call receiver (130) with the message data (204) from the message packet (200) from the received message.

11 Claims, 4 Drawing Sheets

| NAME | BYTE LENGTH | TYPE | CONTENTS |
|---|---|---|---|
| BATCH TAG | 1 | BINARY | THE BATCH FILE TAG NUMBER. THIS WILL BE 0x01 FOR NO BATCH FILE CALL. |
| TRANS TYPE | 1 | ASCII | THE TERMINATED TYPE. IT CAN BE ONE OF THE FOLLOWING:<br>A ADD<br>U UPDATE<br>D DELETE |
| TIME STAMP | 17 | ASCII | NONNULL TERMINATED TIME STAMP FOR THE DATABASE CHANGE. IT IS PROVIDED TO THE API BY THE APPLICATION AS A STRING WITH THE FORMAT "MM/DD/YY<SPACE>HH:MM:SS*. |
| NUM OF FIELDS | 1 | BINARY | THE NUMBER OF FIELDS IN THE CS PACKET BODY. |
| BCC | 1 | BINARY | BLOCK CHECK CHARACTER. IT IS CALCULATED OVER THE WHOLE PACKET EXCEPT FOR THE BBC COMPONET. |
| DEST BD NAME LEN | 1 | BINARY | LENGTH OF THE DESTINATION DATABASE PATHNAME. IT CANNOT EXCEED 64 (CHAR). |
| DEST DB NAME | 0 TO 64 | ASCII | THE PATHNAME (FULL OR PARTIAL) OF THE DESTINATION DATABASE. IT IS NOT NULL TERMINATED. |
| FIELD NAME LEN | 1 | BINARY | THE LENGTH OF A FIELD NAME. |
| FIELD NAME | 1 TO 255 | ASCII | THE NAME OF THE FIELD THAT HAS CHANGED. IT IS NOT NULL TERMINATED. |
| KEY INDEX | 1 | BINARY | THE KEY INDICATOR LEVEL OF THIS FIELD. IT CAN BE ONE OF THE FOLLOWING.<br>0x00 NOT A KEY FIELD<br>0x01 PRIMARY KEY<br>0x02 SECONDARY KEY<br>0x03 TERTIARY KEY<br>0xNN 0xNN"th KEY |
| DATA LEN | 2 | BINARY | THE LENGTH OF DATA |
| DATA | 0 TO 65535 | ASCII OR BINARY | THE ACTUAL DATA. |

METHOD OF REMOTE LAUNCHING APPLICATIONS IN A MESSAGE DELIVERY SYSTEM

FIELD OF THE INVENTION

This invention relates generally to message communication systems, such as for electronic mail systems, and more specifically to a one-way message communication system for delivering messages to at least one portable receiving unit for launching applications therein.

BACKGROUND OF THE INVENTION

There is a strong trend in the marketplace for delivering messages in a one-way communication system, such as a paging system, over wide geographic areas. Subscribers of such a service typically desire to roam over distant geographic areas, such as different cities that are possibly in different states of the country, and be able to receive messages from originating parties or callers while the subscribers are roaming from point-to-point.

Further, a group of subscribers can constitute a team which needs their data and communications coordinated on a regular basis. For example, a sales team comprises one hundred salespeople and at least one salesmanager. The salesmanager maintains a price book with the latest information on a large assortment of products and services. Each salesperson also maintains a price book corresponding to the salesmanager price book. These "price books" are preferably maintained electronically in portable devices, such as in personal computers with databases, to allow individuals efficient access to large amounts of data. Further, each team member carries on their person a portable selective call receiver for receiving messages transmitted by the communication system over the wide geographic coverage areas. These messages can communicate information between team members. However, these messages today are directed to the user of the receiving portable selective call receiver and are normally available for display to the user. The user after manually inspecting a received sales data would update one or more local databases with the received sales data by manually locating each sales database in the portable computing device, manually launching the database application with each sales database, locating the entry location for the sales data, and manually entering the sales data in the particular database. This process is very tedious, error prone, and requires a human user to be present at all times that sales data is received and to be updated locally in a portable unit, which is very burdensome on the user.

Therefore, although there's a strong need in the marketplace for providing message delivery over a paging communication channel over a wide geographic coverage area to automatically coordinate the data and communication needs of subscribing workgroups and team members, no known communication system offers such automatic coordination of data and communication between subscribers.

SUMMARY OF THE INVENTION

According to an embodiment of the present invention, there is provided a communication system and method therefor for delivering messages to at least one selective call receiver. A first portable selective call receiver updates a record in a database in the first portable selective call receiver, and automatically creates a message packet in response to the record updating, the message packet including message data comprising changes updated to the record. The first portable selective call receiver then sends the message packet to a central paging communication system. The central paging communication system receives the message packet, couples destination address information with the message packet to provide a message, and wireless transmits the message over a paging communication channel. A second portable selective call receiver receives the message from the paging communication channel, and updates a record in a database in the second portable selective call receiver with the message data from the message packet from the received message.

In an aspect of the present invention, the message data comprises a batch tag to indicate one of a manual and an automatic operating mode. The first portable selective call receiver sets the batch tag in the message data to one of a manual and an automatic operating mode for a message packet. Then, the second portable selective call receiver, after storing the message packet, automatically performs predetermined functions in the second portable selective call receiver in response to the batch tag in the message data from the message packet from the received message indicating an automatic mode for the message packet. Alternatively, the second portable selective call receiver stores the message packet for subsequent manual inspection by a user of the second portable selective call receiver in response to the batch tag in the message data from the message packet from the received message indicating a manual mode for the message packet.

BRIEF DESCRIPTION OF THE DRAWINGS

FIG. 3 is a table representation of the packet elements shown in FIG. 2.

DESCRIPTION OF A PREFERRED EMBODIMENT

Figure 1:
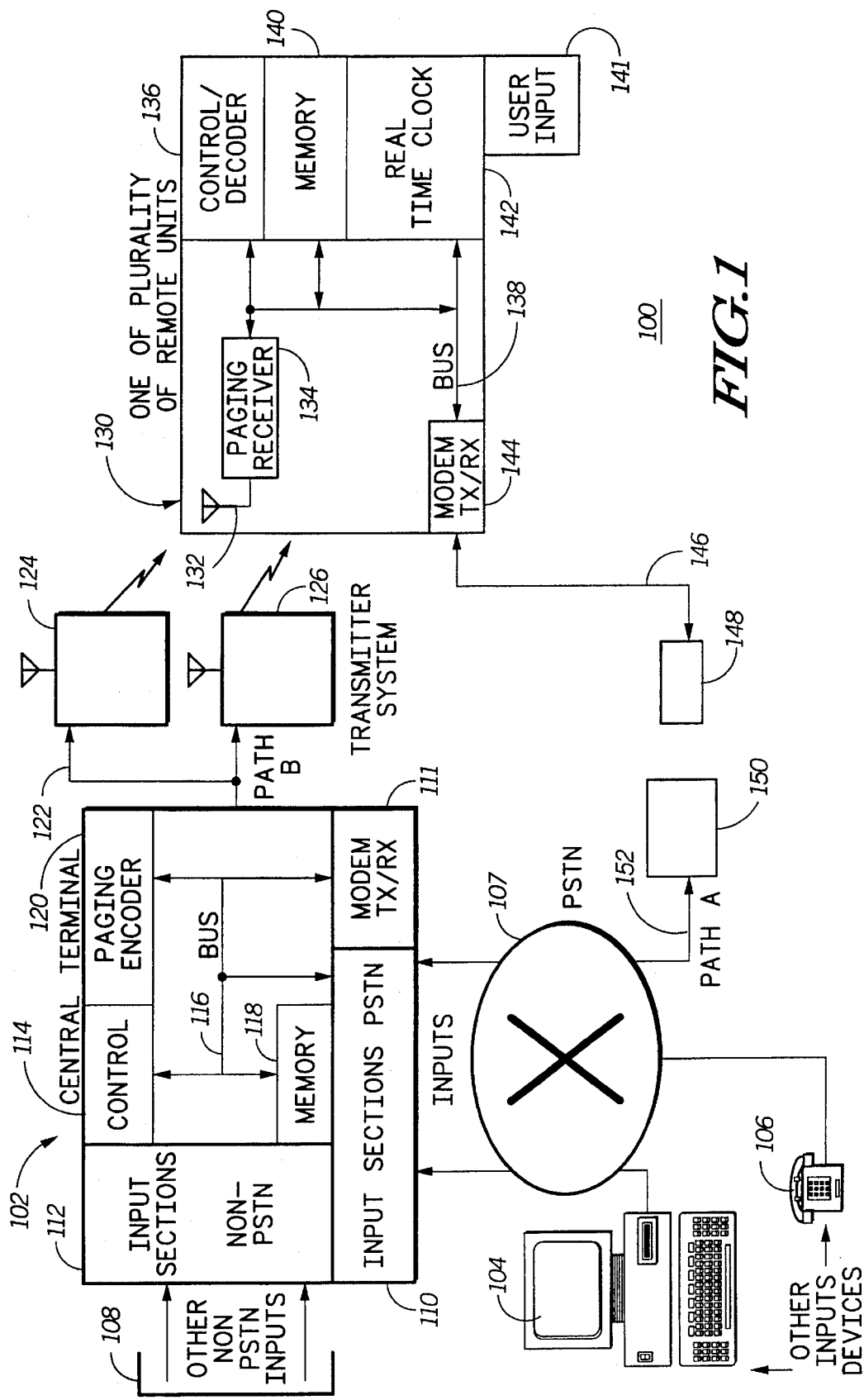
FIG. 1 is an electrical block diagram illustrating a communication system, in accordance with the preferred embodiment of the present invention.

FIG. 1 shows a communication system 100 utilizing a paging transmitter system 120, 122, 124, 126, for delivering message packets to at least one portable remote unit, e.g., a portable selective call receiver 130, in accordance with the preferred embodiment of the present invention. A sending computing device 130 sends message packets from an application operating in the sending computing device 130 through the communication system 100 to at least one associated receiving device 130. Each of the at least one receiving device 130 can utilize the message packet information to update data therein, such as in a local database, and invoke functions in the receiving device 130 as indicated by the received message packet, as will be more fully discussed below.

A central terminal 102 comprises input sections 110, 112 for receiving inputs from a number of different devices 104, 106, 108, including receiving page requests for initiating pages that are transmitted by the paging transmitter system 120, 122, 124, 126, to the at least one portable remote unit 130. The central terminal 102 has input sections 110 that interface with the telephone company equipment, such as the public switched telephone network (PSTN) 107. Personal computers or other computing devices 104 can access the input sections 110 through the PSTN using a dial-up telephone line and modem communication. Other calling devices, such as telephone input devices 106 can access the input sections 110 of the central terminal 102 through the PSTN. Typically, these input devices 104, 106, can remotely initiate page requests through the central terminal 102 by calling up the input sections 110 of the central terminal 102 over dial-up telephone lines of the PSTN 107.

Alternatively, other input sections 112 of the central terminal 102 can receive inputs, such as page requests, from local computing devices 108, such as a local personal computer or console or other terminal device. Typically, the one or more local input devices 108 interface with the input sections 112 of the central terminal 102 via direct wire line connections using standard RS-232 or RS-422 interface.

The input sections 110, 112, communicate page requests to a controller 114 through a communication bus 116. The controller 114 may comprise controller circuitry and associated memory such that an incoming page request may be accepted and stored into available memory for subsequent transmission to one or more selective call receivers 130. Additionally, a non-volatile memory device 118, such as battery backed up RAM, one or more disc drive units, or other non-volatile storage medium, is utilized by the controller 114 for longer term storage of messages destined for the one or more selective call receivers (remote portable units) 130. The controller 114 typically couples the message information and other associated information to the memory device 118 via the bus 116. The message information, which can include numeric, alphanumeric, or binary information, and other associated information stored in the memory 118 can be used by the controller 114 for reliable delivery of the message to the destination or remote unit 130, as will be more fully discussed below.

The controller 114 couples messages to the paging encoder 120 over the bus 116 for encoding the messages for transmission over a paging channel. The paging encoder 120 then couples the encoded messages over a communication path 122 to one or more paging transmitter systems 124, 126, for transmission over a paging communication channel. The communication path 122, in this example, will be labeled path B which routes the messages from the central terminal 102 to a paging transmitter system 124, 126, and over a paging communication channel for reception by the one or more selective call receivers 130. The general operation of a communication system including a paging system of the type shown in FIG. 1 is more fully described in U.S. Pat. No. 5,138,311, issued Aug. 11, 1992, entitled, "Communication System Having Adaptable Message Information Formats", which is assigned to the same assignee as the present invention and is incorporated herein by reference.

The selective call receiver 130 preferably incorporates a paging receiver 134 that operates to receive messages transmitted over the paging communication channel through the antenna 132. The operation of a paging receiver 134 of the general type shown in FIG. 1 is well known and is more fully described in U.S. Pat. No. 4,518,961 issued May 21, 1985, entitled, "Universal Paging Device With Power Conservation", which is assigned to the same assignee as the present invention and is incorporated herein by reference.

The paging receiver 134 couples a received message packet to the controller 136 through the bus 138. The controller 136 operates to decode the received message packet, for matching address information in the received message to a predetermined address in the selective call receiver 130. In this way, the controller 136 can determine whether the received message is intended for the particular selective call receiver 130. Further, a memory 140 is coupled to the paging receiver 134 and the controller 136 through the bus 138 for storing the received message packet in the memory 140. A user can access user input means 141, such as buttons or switches, at the remote unit 130 to cause the message data of a received message packet to be displayed on a display, e.g., a liquid crystal display (not shown). The user can then read the message that is visible on the display. User input at the remote unit 130 can also cause the remote unit 130 to perform other functions, such as may be well known to users of selective call receivers and portable personal computing devices.

A real time clock 142 is also coupled through the bus 138 to the controller 136 for providing time information thereto. The remote unit 130 is then capable of providing, for example, time information to the user as part of displaying information on the display (not shown). Additionally, the controller 136 can utilize the time information provided by the real time clock 142 to keep track of the time when messages were received at the remote unit 130, and other useful operations.

Furthermore, the selective call receiver 130 includes a modem transmitting unit and a modem receiving unit 144 and the associated telephone interfacing circuitry or other suitable communications apparatus (e.g., packet radio modem) which allows the user of the selective call receiver 130 to connect the selective call receiver to a telephone interface 150, such as may be provided by an RJ11 plug 148 and associated wiring 146 at the selective call receiver 130 and the complimentary wall jack 150 and associated wiring 152 thereof. This telephone interface 144, 146, 148, 150, 152, allows the controller 136 of the selective call receiver 130 to remotely access the central terminal 102 through a dial-up telephone line and the PSTN 107. At the central terminal 102, a modem transmitting unit and a modem receiving unit 111 is capable of communicating with the modem 144 at the selective call receiver 130. In this way, the selective call receiver 130 can communicate with the central terminal 102 and receive message information therefrom through a separate communication path which in this example is labeled path A 152. Therefore, the selective call receiver 130 can receive message information from the central terminal 102 via path A 152 and via path B 122. The path A 152 communication medium and the path B 122 communication medium can comprise any communication paths, such as direct wired line path, telephone line path, or wireless communication path including at least one radio communication channel, where preferably path A 152 is different than path B 122.

In the preferred embodiment, path A 152 is a dial-up telephone line using modem communication between the central terminal 102 and the remote unit 130. Also, preferably path B includes a paging communication channel for transmitting messages to the selective call receiver 130. Alternatively, path A may be a one-way or two-way radio frequency communication channel between the remote unit 130 and the central terminal 102, and path B can be a paging communication channel. Additionally, in another alternative, path A and path B can be one-way or two-way radio frequency communication channels. An advantage of delivering messages to the remote unit 130 through the paging communication channel over the two-way radio frequency communication channel is that typically more messages can be delivered through the medium in the paging communication channel. This in turn enhances the commercial viability of the communication system 100. However, using two-way radio frequency communication channels for both path A and path B may be perfectly acceptable in some systems.

By using a dial up telephone line interface for path A 152, and utilizing modem communication between the remote unit 130 and the central terminal 102 in the preferred embodiment, the reliability of transferring message packets between the remote unit 130 and the central terminal 102 is relatively high. Hence, it is advantageous to transfer messages over the dial-up telephone line interface 152 because it is a more reliable communication medium.

In summary, the communication system 100 of the preferred embodiment of the present invention allows high throughput of message packets between the central terminal 102 and the portable remote units 130 by transmitting message packets over the path B 122, e.g., a radio frequency paging channel, for normal communication of message packets between the central terminal 102 and the remote units 130.

Figure 2:
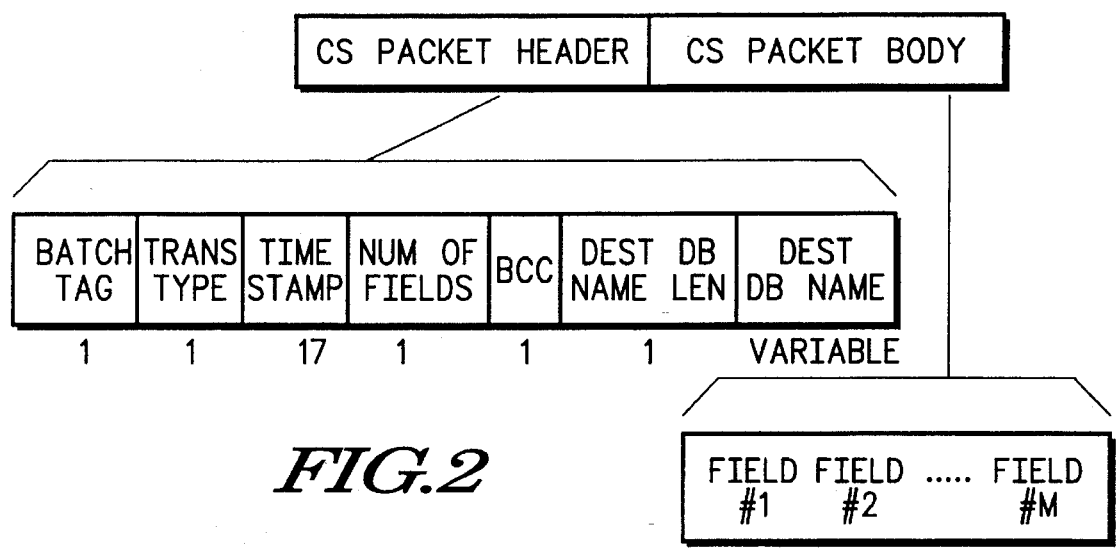
FIG. 2 is a block diagram illustrating a message data packet according to the preferred embodiment of the present invention.

Referring to FIGS. 2 and 3, a block diagram of a message data packet (200) and a table 300 representing the elements of the packet 200 are shown according to the preferred embodiment of the present invention. The packet 200 is composed of a packet header 202 and a packet body 204. The packet body 204 contains the message data being transmitted to at least one remote unit 130. The message data in the packet body 204 can be organized into fields as shown or in another structure which is usable by a database by the at least one remote unit 130 as will be more fully discussed below.

The packet header 202 preferably comprises a batch tag 206 which indicates to the recipient remote unit 130 whether a batch file routine will be executed upon reception of the message packet 200 at the remote unit 130. This batch tag information 206 provides one level of intelligence within the message packet 200 by allowing a remote unit 130 upon reception of the message packet 200 to invoke a predetermined batch file routine which can perform user customized functions at the remote unit 130 after receiving the message packet 200. The batch file routine can be invoked automatically upon reception of the message packet 200. Alternatively, the batch tag information 206 may indicate a manual mode of operation. In this case, the received message information is stored in a message holding file until a user is available to manually inspect the message information and decide what actions to take in response thereto.

Optionally, the packet header 202 comprises additional fields of information for processing at a remote unit 130. For example, a transaction type 208, can be included in the packet header 202 to invoke specific functions at the remote unit 130, such as shown in the table 300. For example, the transaction type 208 may indicate an ad function is requested by the message packet 200 which then would add a record of information to the local database at the remote unit 130. The record of information, of course, is transmitted in the packet body 204.

A time stamp field 210 provides time information to a receiving remote unit 130. This time information can be used to keep track of received messages at a remote unit 130.

Further, a number of fields count information 212 can be included in the packet header 202 to indicate the number of fields found in the packet body 204. A block check character 214 can be used by the communication protocol for error correction.

Additionally, a second level of intelligence in the message packet 200 is found in the destination database name variable length field 218 which is coupled to a name length count 216. By providing a database name in the packet header 202, the receiving remote unit 130 is able to locate one or more databases with that name throughout a file organization system in memory 140. For example, a personal computing device typically has a filing system, such as a directory system, to organize files in the memory 140 and to allow efficient retrieval thereof. With the destination database name 218 in the message packet 200, a remote unit 130 can utilize the database name to find the destination database in a filing organization system in the remote unit 130. If there are more than one databases with the same name, then each of the found databases can be updated with the particular information in the packet body. Hence, the destination information in a packet 200 identifies where data from the packet body 204 will go in a database of a receiving remote unit 130, allowing the remote unit 130 to resolve the location of the database in memory 140 utilizing an internal file organization system, such as a directory system. If there are more than one database with the same destination name, then they can all be updated with the message data in the packet body 204.

Figure 4:
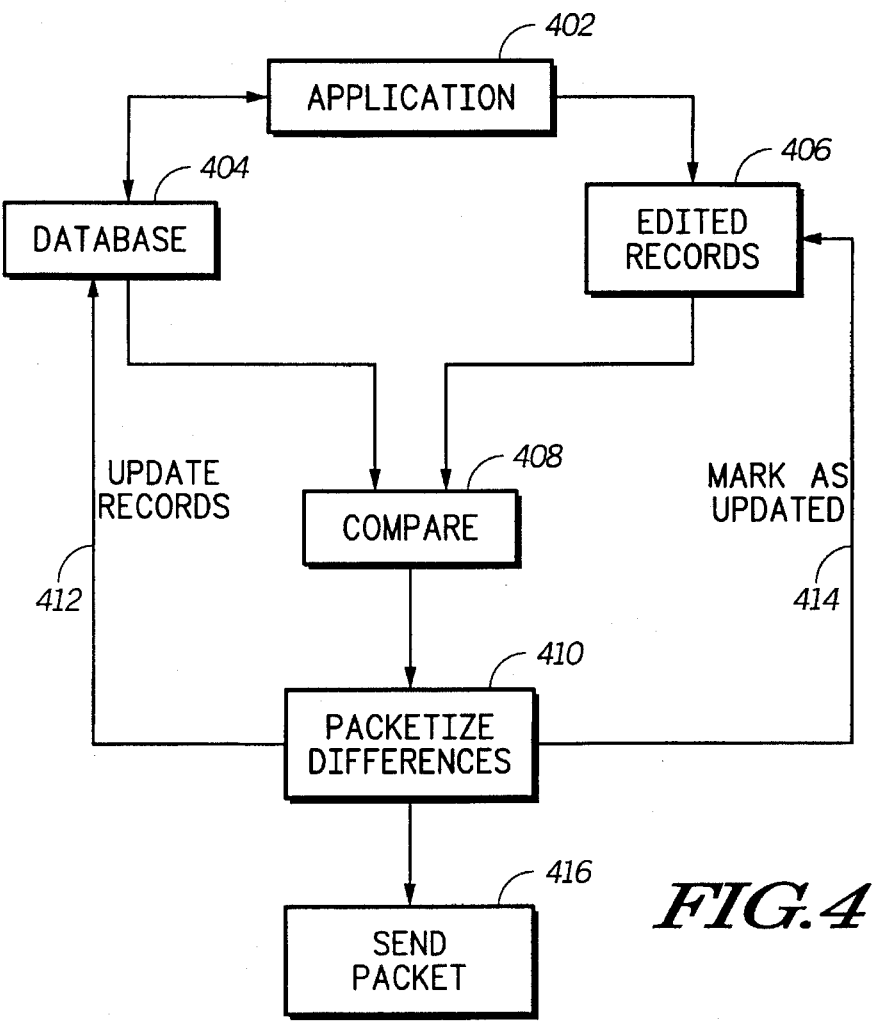
FIG. 4 is a first operational flow diagram for a portable remote unit, according to the preferred embodiment of the present invention.

FIG. 4 is a first operational flow diagram for a portable remote unit 130 according to the preferred embodiment of the present invention. This operational sequence is followed by a remote unit 130 where a user is updating records in a database and the remote unit 130 keeps track of the changes to records in the database and sends message packets to at least one associated portable remote unit 130 for processing therein. Specifically, a user of an application 402 gets records from the database 404 and makes changes to the records 406. Records edited by the user 406 are compared to the original database records 404 to determine differences 408. Upon determining a difference between a user edited record and the corresponding record in the database 404, the remote unit 130 creates a message packet including the differences at step 410. Further, the remote unit 130 marks, at step 414, the edited records 406. The remote unit 130, also updates, at step 412, the edited records into the database 404 when the records have been changed from the original database records. Lastly, the message packet is sent from the sending remote unit, at step 416, through the paging communication system 100 (FIG. 1). For example, a dial out modem 144 can access through the public switched telephone network (PSTN) the modem 111 of the central terminal 102. The message packet with the differences is transmitted through the telephone line to the paging system which then routes the message packet including destination addressing information through the transmitter system 124, 126. At least one remote unit 130 associated with the sending remote unit 130 will receive the message packet and update its local database information accordingly. In this way, a sending remote unit 130 can send updates of information to other associated remote units 130 to automatically coordinate their databases to correspond to the sending units' database.

Figure 5:
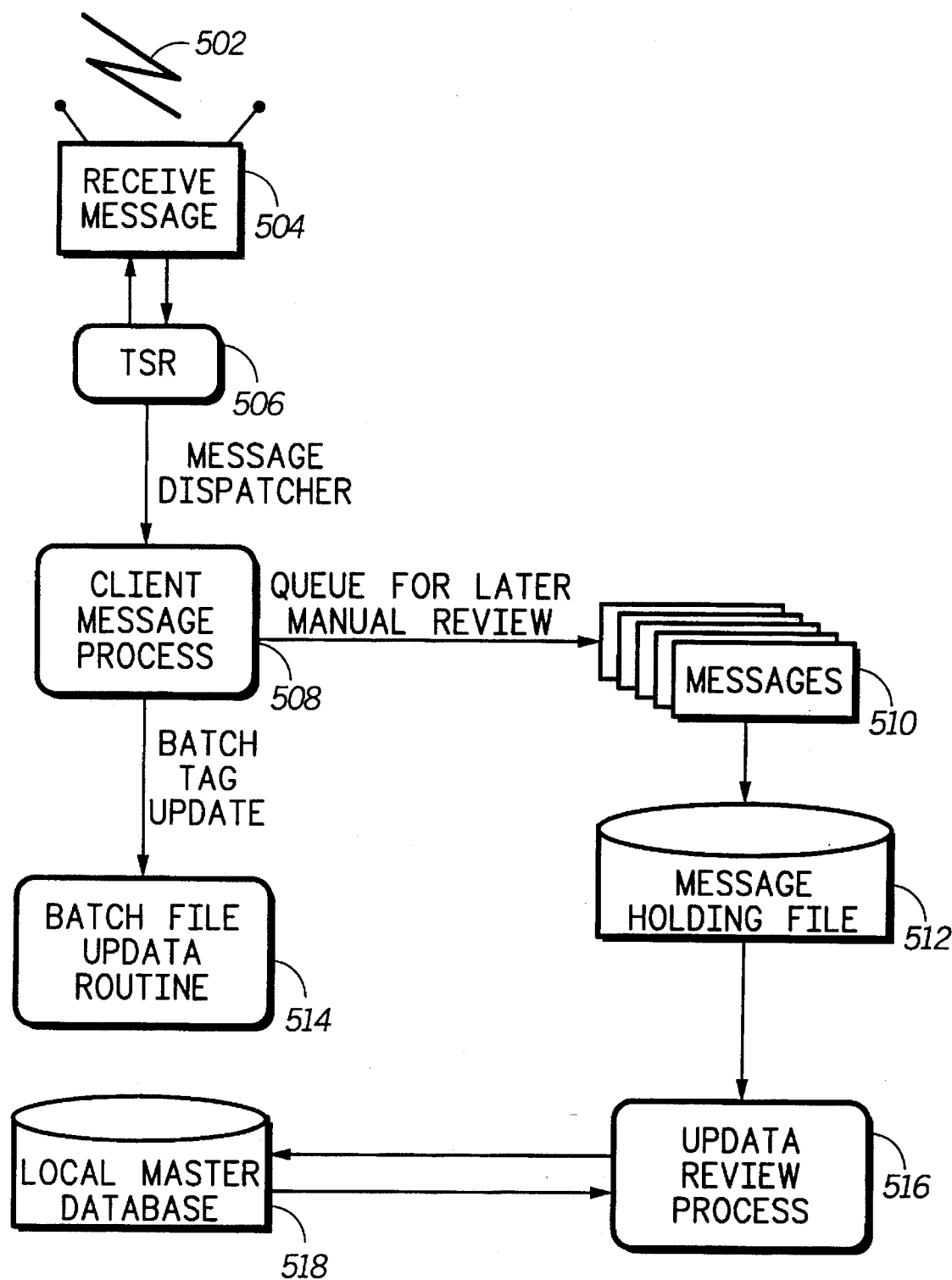
FIG. 5 is a second operational flow diagram for a portable remote unit, according to the preferred embodiment of the present invention.

FIG. 5 is a second operational flow diagram for a portable remote unit 130 according to the preferred embodiment of the present invention. After a message packet is transmitted 502, a receiving remote unit 130 will receive the message packet 504 and forward the message packet to a processing routine, at step 506, such as a terminate stay resident (TSR) routine available in a personal computing device. Optionally, a Windows based application, instead of the TSR, can process the message packet 506 following a predetermined sequence of events. The received message packet is dispatched to a client message process in the personal computing device at step 508. If the batch tag 206 (FIG. 2) indicates manual mode operation, then the message packet is cued for later manual review by a user at step 510. The cued messages are stored in a message holding file 512 for subsequent retrieval and inspection by a user. On the other hand, if the batch tag 206 indicates automatic processing, then a batch file update routine is invoked, at step 514. The batch file update routine 514 automatically performs a sequence of functions that are predetermined by the user of the receiving remote unit 130. For example, a batch file update routine 514 may extract the message information from the packet 200 and send it to a printer (not shown) coupled to the remote unit 130 for printing the message information on a hard copy. Additionally, a message may be sent to a display for reference by a user of the remote unit 130.

In the automatic mode, the batch file update routine 514 forwards the message packet to an update review process 516 which then locates the master database 518 and updates the record information accordingly. In the manual mode, alternatively, after inspecting a message information as part of a message packet in the message holding file 512, a user can enter user input through a user interface 141 to invoke the update review process 516 to update the message information in the local database 518. In this way, the received message packet provides message information that can be automatically or manually updated into a local database 518.

Therefore, as discussed above, a user of a remote unit 130 can update a local database 404 utilizing a local application 402 in the remote unit 130, which then causes the remote unit 130 to send a message packet over a paging communication system 100 to at least one associated remote unit 130. The at least one receiving unit 130 can automatically update a local database or can store the received message packet in a cue for subsequent inspection by the user which can then cause the message data to update a local database 518 in a manual mode. For example, a sales team can have "price book" information updated to a large number of portable remote units 130 when a sales manager updates "price book" information in a database 404 in the sales manager's remote unit 130. This communication process can be totally automatic and transparent to all the sales team members. Each user of a receiving remote unit 130 can automatically receive updates from the sales manager remote unit 130 and have current price book information in their local database. The coordination of data and communication between the associated team member units 130 is a significant advantage that is not available in known communications systems.

What is claimed is:

1. A method in a communication system for delivering messages to a selective call receiver, the method comprising the steps of:

at a first portable selective call receiver:
updating a record in a database in the first portable selective call receiver;
automatically creating a message packet in response to the record updating step, the message packet including message data comprising changes updated to the record and a batch tag to indicate one of a manual and an automatic operating mode;
setting the batch tag in the message data to one of a manual and an automatic operating mode for a message packet; and sending the message packet to a central paging communication system;
at the central paging communicating system:
receiving the message packet;
coupling destination address information with the message packet to provide a message; and
wireless transmitting the message over a paging communication channel; and
at a second portable selective call receiver:
receiving the message from the paging communication channel;
storing the message packet contained in the message received from the paging communication channel and automatically performing predetermined functions in the second portable selective call receiver in response to the batch tag in the message data from the message packet from the received message indicating an automatic mode for the message packet;
storing the message packet for subsequent manual inspection by a user of the second portable selective call receiver in response to the batch tag in the message data from the message packet from the received message indicating a manual mode for the message packet; and
updating a record in a database in the second portable selective call receiver with the message data from the message packet from the received message.

2. The method of claim 1, wherein the second portable selective call receiver comprises a personal computing device and the predetermined functions are performed by executing a batch file comprising user configurable predetermined instructions.

3. A communication system comprising:
a first portable remote unit comprising:
a first memory for storing at least a first user modifiable database;
a first user interface for accepting user input from a user of the first portable remote unit;
a first controller coupled to the first memory and the first user interface for updating records in the first database in response to the user input, and for automatically creating message packets including message data comprising changes updated to the records; and
a transmitter coupled to the first controller for automatically transmitting the message packets to a paging system; and
a paging system for delivering messages over a paging communication channel to at least one other portable remote unit associated with the first, the paging system comprising:
paging transmitting means for transmitting messages comprising the message packets to the at least one other portable remote unit over a paging communication channel; and
the at least one other portable remote unit comprising:
a paging receiver for receiving the messages comprising the message packets;
a second memory coupled to the paging receiver for storing the received messages comprising the message packets, and for storing at least a second user modifiable database;
a second controller coupled to the second memory for automatically updating records of the second user modifiable database with the changes updated to the records of the first user modifiable database from the message packets from the received messages.

4. The communication system of claim 3, wherein the transmitter comprises modem transmitting means for automatically transmitting the message packets from the first portable remote unit to the paging system over a dial-up telephone interface using modem communication.

5. The communication system of claim 3, wherein each message packet comprises a batch tag for indicating one of a manual mode and an automatic mode for the message packet, and wherein the first controller sets the batch tag in the message packets according to a predetermined value at the first portable remote unit, and wherein the second controller stores the message packets from the received messages for subsequent manual inspection by a user of the at least one other portable remote unit in response to the batch tag in the message packets indicating a manual mode for the message packets.

6. The communication system of claim 3, wherein each message packet comprises a batch tag for indicating one of a manual mode and an automatic mode for the message packet, and wherein the first controller sets the batch tag according to a predetermined value at the first portable remote unit, and wherein the second controller stores the message packets from the received messages and automatically performs predetermined functions in the at least one other portable remote unit in response to the batch tag in the message packets indicating an automatic mode for the message packets.

7. The communication system of claim 6, wherein the second controller comprises a personal computing device and the predetermined functions are automatically performed by executing a batch file comprising user configurable predetermined instructions.

8. A portable selective call receiver associated with a plurality of portable selective call receivers in a paging system, the portable selective call receiver comprising:

a memory for storing a user modifiable database;

a user interface for accepting user input;

a controller electrically coupled to the memory and the user interface for modifying a record in the user modifiable database in response to the user input, and for creating a message packet in response to modifying the record, the message packet including message data comprising changes updated to the record;

a modem interface coupled to the controller for transmitting a message packet to a paging system for delivering a first message including the message packet over a paging communication channel for reception by at least a second one of the plurality of portable selective call receivers; and a paging receiver electrically coupled to the controller and to the memory for receiving a second message from the paging communication channel, the second message including a second message packet created by another one of the plurality of portable selective call receivers, the second message packet including message data comprising changes updated to a second record in a second user modifiable database of the other one of the plurality of portable selective call receivers, and for updating a record in the user modifiable database in the memory with the message data from the second message packet from the received second message, the changes updated to the second record in the second user modifiable database being used to update a record in the user modifiable database in the memory to coordinate the record information in the first and second user modifiable databases.

9. The portable selective call receiver of claim 8, wherein the second message packet comprises a batch tag set by the other one of the plurality of portable selective call receivers for indicating one of a manual mode and an automatic mode for the second message packet, and wherein the controller stores the second message packet in the memory for subsequent manual inspection by a user of the portable selective call receiver in response to the batch tag in the second message packet indicating a manual mode for the second message packet.

10. The portable selective call receiver of claim 8, wherein the second message packet comprises a batch tag set by the other one of the plurality of portable selective call receivers for indicating one of a manual mode and an automatic mode for the second message packet, and wherein the controller stores the second message packet in the memory and automatically performs predetermined functions in the portable selective call receiver in response to the batch tag in the second message packet indicating an automatic mode for the second message packet.

11. The communication system of claim 10, wherein the controller comprises a personal computing device and the predetermined functions are automatically performed by executing a batch file comprising user configurable predetermined instructions.

* * * * *